US007154529B2

(12) United States Patent
Hoke et al.

(10) Patent No.: US 7,154,529 B2
(45) Date of Patent: Dec. 26, 2006

(54) SYSTEM AND METHOD FOR ENABLING A PERSON TO VIEW IMAGES OF THE PERSON WEARING AN ACCESSORY BEFORE PURCHASING THE ACCESSORY

(76) Inventors: Donald G. Hoke, 33232 SE. Bryant Rd., Estacada, OR (US) 97023; Richard N. Martin, 10920 NW. 5th Ave., Vancouver, WA (US) 98685

( * ) Notice: Subject to any disclaimer, the term of this patent is extended or adjusted under 35 U.S.C. 154(b) by 46 days.

(21) Appl. No.: 10/799,414

(22) Filed: Mar. 12, 2004

(65) Prior Publication Data
US 2005/0200963 A1 Sep. 15, 2005

(51) Int. Cl.
*H04N 7/18* (2006.01)
*G09G 5/00* (2006.01)
*G06F 17/60* (2006.01)
*G03B 35/00* (2006.01)

(52) U.S. Cl. ............... 348/77; 348/207.1; 348/207.11; 348/211.99; 348/211.2; 348/715; 348/716; 348/718; 348/719; 348/720; 348/721; 345/173; 705/27; 396/326; 396/329; 396/335; 396/430

(58) Field of Classification Search ............... 359/630; 348/61, 77, 207.1, 207.11, 211.99, 211.2, 348/714–721; 345/1.3, 169, 156–158, 173–178; 396/326, 329, 332, 335
See application file for complete search history.

(56) References Cited

U.S. PATENT DOCUMENTS 4,991,005 A * 2/1991 Smith ........................ 348/77
5,060,171 A * 10/1991 Steir et al. .................. 345/630
5,551,021 A * 8/1996 Harada et al. ............ 707/104.1
5,576,778 A 11/1996 Fujie et al. .................. 351/177
5,592,248 A 1/1997 Norton et al. ............... 351/246
5,970,471 A * 10/1999 Hill ............................. 705/27
5,983,201 A 11/1999 Fay .............................. 705/27
7,012,636 B1 * 3/2006 Hatanaka ............... 348/211.99
7,015,957 B1 * 3/2006 Romano et al. ......... 348/207.1
7,062,454 B1 * 6/2006 Giannini et al. ............. 705/27
7,075,568 B1 * 7/2006 Aizawa .................. 348/211.99
2003/0063187 A1* 4/2003 Pagano et al. ................ 348/61
2003/0065255 A1 4/2003 Giacchetti et al. .......... 600/407
2003/0081173 A1 5/2003 Dreher ........................ 351/204
2003/0090625 A1 5/2003 Izumitani et al. ........... 351/204
2005/0158015 A1* 7/2005 Nakayama et al. ............ 386/4
2006/0103729 A1* 5/2006 Burns et al. ............. 348/207.1

* cited by examiner

*Primary Examiner*—Evelyn A. Lester
(74) *Attorney, Agent, or Firm*—Starkweather & Associates; Michael W. Starkweather; Jason P. Webb

(57) ABSTRACT

A personal optical viewer enables a person to view images of how the person looks wearing an accessory and compare images of how the customer looks wearing different accessories. A seller provides an accessory to a person. A capturing device captures a photograph or a video of the person and stores the image in a memory device. The personal optical viewer displays each image to the person and the person chooses which images to keep, reject, delete, or compare. The personal optical viewer replaces rejected images with other images stored in the memory device, and when the stored images have been exhausted the personal optical viewer automatically enlarges the remaining displayed images.

18 Claims, 8 Drawing Sheets

SYSTEM AND METHOD FOR ENABLING A PERSON TO VIEW IMAGES OF THE PERSON WEARING AN ACCESSORY BEFORE PURCHASING THE ACCESSORY

BACKGROUND OF THE INVENTION

1. The Field of the Invention

The present invention pertains to the field of wearing apparel and accessories. More specifically, the present invention is concerned with displaying images of a person wearing different accessories, like glasses.

2. The Relevant Art

The eyewear industry is a $16 billion a year business. In an attempt to capitalize on the eyewear industry, designers and manufacturers have introduced more fashionable and stylish eyeglass frames. Naturally, many eyeglass wearers are interested in looking attractive as well as staying abreast of the latest fashions and trends. For many eyeglass wearers, vision centers located at malls and department stores provide an ideal mechanism for evaluating the latest styles and fashions. In this environment, consumers may try on a variety of eyeglasses and attempt to determine which eyeglasses are most aesthetically pleasing. Unfortunately, depending on the customers' prescriptions, many must rely on their best-guess, or other people's opinions, on how styles of glasses look on them. In other words, since many people may not see very well without their prescription glasses, they may not see what they look like when trying on the sample "plain glass" glasses. Thus, the customers may not see how they look with their new eyewear until after they have had their prescribed lenses installed and are having the glasses fitted. The customers are now stuck with their best-guess decision or another person's opinion.

One recent survey showed that approximately seventy percent of all customers who come in for glasses also choose new frames. Between twenty-five and fifty percent of the customers do not clearly see their choice of new frames in a mirror. Approximately fifty percent of the same customers relied on another's opinion of how the frames looked to them. Finally, one hundred percent of the eyewear specialists said that it would definitely be helpful if all the customers were able to personally see their choice in eyewear frame/styles clearly.

Similarly, stores are consistently filled with customers trying out the latest styles and fashions. The customers are generally confined to a small dressing room with an inadequate number of mirrors and lights when trying on new clothes. The customers are unable to view how the new apparel looks on their body and must wait until they get home to try the apparel with different mirrors, different lights, different views, and different opinions.

The current state of the art has not resolved those issues and is therefore deficient for the reasons stated above. For example, one system uses a computer, in a home for example, to adjust the size of a product to fit to a predetermined image of a customer. The system then allows a customer to determine which eyeglasses look the best and place an order electronically. In another system, the customer visits a vision center, picks out a particular eyeglass frame, and has a digital photograph taken which is sent by modem over telephone lines directly to another computer located at the opticians office wherein the lens is manufactured to optical specifications and to dimensional specifications dictated by spatial, angular, and dimensional relationships established from the digital photograph.

The first system described above is deficient because the customer does not have the benefit of actually trying on the eyeglasses, rather, the eyeglasses are electronically superimposed. Accordingly, the customer does not get to determine the comfort level, the weight, or the feel of the eyeglasses. In addition, the first system is deficient because the customer must then order the eyeglasses rather than make an instant purchase. The second system is deficient because the customer may not see how the eyeglass frame looks while being worn.

Therefore, what is needed is a system and method to enable a customer to try a variety of eyeglass frames or apparel and, before making a purchase, be able to view, review, and compare images of how the customer looks wearing the various accessories. Beneficially, such a method would provide to the customer a certain level of confidence and satisfaction with the new items before purchasing them. In addition, such a method would benefit the optician, eyeglass frame providers, and store sales by limiting the number of returns due to dissatisfied customers.

Additional features and advantages will become apparent in studying the ensuing drawings and description.

SUMMARY OF THE INVENTION

The various elements of the present invention have been developed in response to the present state of the art, and in particular, in response to the problems and needs in the art that have not yet been fully solved by currently available methods of enabling eyeglass and apparel shoppers, for example, to clearly view themselves wearing their choice of frames and clothing. Accordingly, the present invention provides an improved method that overcomes many or all of the above-discussed shortcomings in the art.

In accordance with the present invention, a method provides for enabling people to view and compare images of themselves, on a display screen, wearing various accessories, comprising the steps of capturing images of the person, storing the images in a memory, displaying the images to the person, and reviewing the images with the use of a command module.

The present invention includes a system for enabling people to view and compare images of themselves wearing various accessories and comprises a capturing device, a memory device, a display device, and a command module.

The various elements and aspects of the present invention provide people with a higher level of confidence that they will look good with the goods they are purchasing and will provide sellers of goods with a higher level of customer satisfaction as well as decrease the number of returns. These and other features and advantages of the present invention will become more fully apparent from the following description and appended claims, or may be learned by the practice of the invention as set forth hereinafter.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments thereof, which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
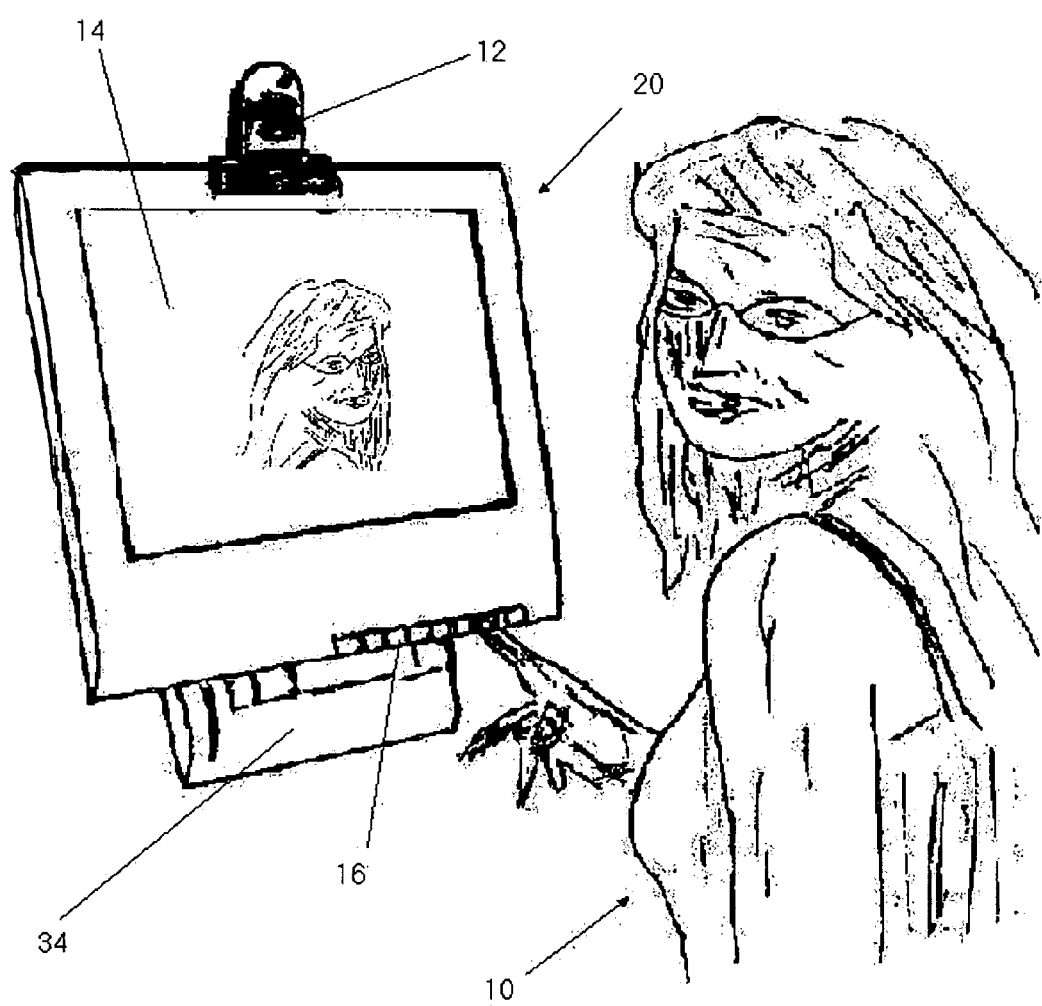
FIG. 1 is a diagram illustrating one embodiment of a customer using the personal optical viewer in accordance with the present invention.

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

FIG. 1 illustrates one embodiment of a personal optical viewer 20. Accordingly, a customer 10 is stationed in front of a capturing device 12, like a camera, wearing an accessory provided by a particular retailer, but chosen by the customer 10. The capturing device 12 may be programmed for auto focus or customer controlled zoom using a command module 16. The capturing device 12 may take both still photographs and motion pictures. In this particular embodiment, the capturing device 12 is positioned to tilt forward and backward to focus on different accessories worn by the customer 10. In other embodiments, the capturing device 12 may rotate up to 360 degrees to give the optician, or the customer 10, the ability to adjust the area of focus. The personal optical viewer 20 includes a monitor 14 for displaying the field observed by the digital capturing device 12. The monitor 14 maybe wall mounted, portable, or placed on a table or desk.

In this embodiment, the command module 16 is comprised of buttons 17 to initiate the program, zoom, capture, enlarge, review, delete, and change the sequence of the images 19. For example, to review the images 19 taken by the capturing device 12, the customer 10 may initiate the review process by pressing one of the buttons 17. During the review process the images 19 are displayed to the customer 10 in series, for example, either four, six, eight or ten images may displayed at a time. The customer 10 controls the number of images 19 displayed using the command module 16 and may remove images 19 that may not be favorable. The buttons 17 may be operated by the customer 10 or by another individual. It should be recognized that any type of command module 16 may be used, such as a touch-screen.

The personal optical viewer 20 includes a customer selector 34 to allow numerous customers 10 the ability to use the personal optical viewer 20 at the same time. For example, although Adam has been using the personal optical viewer 20 and has captured numerous images 19, Eve may use the personal optical viewer 20 while Adam is searching for other accessories to sample. Eve may capture images 19 and store the image data on a memory file. While Eve continues looking for other accessories, Adam may continue to capture additional images 19 or he may review his captured images 19, and choose his favorite items from those images 19 stored in his particular memory file.

Figure 2:
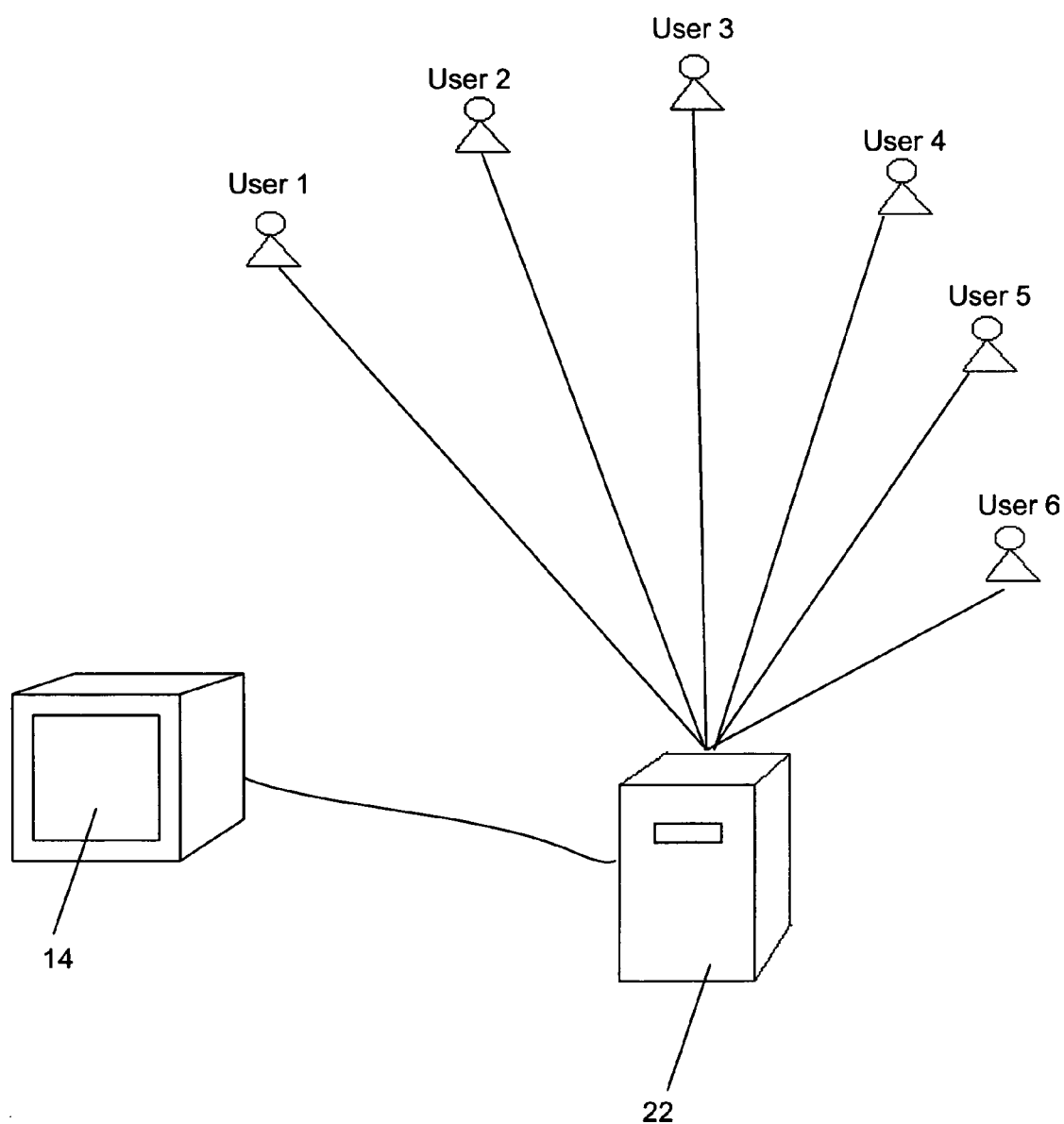
FIG. 2 is another embodiment of the personal optical viewer set up to be used with multiple users.

FIG. 2 illustrates another embodiment of the invention wherein the store may dedicate capturing devices 12 to dressing rooms, or another part of the store, each capturing device 12 being wired to a predetermined file on a memory device 22. The customer 10 in the dressing room controls the capturing device 12 to take the images 19, which are then automatically stored in the dressing room's predetermined file. This particular aspect of the invention would provide the customer 10 with more privacy, and efficiency, as the customer 10 would not have to leave the dressing room to capture an image for each sample article. There may be a single, or multiple display devices 14, throughout the store, or may include a display device 14 in each individual dressing room.

It is noted that the memory device 22 may be a permanent internal memory within the display 14, an external memory, or a removable memory, such as a recordable CD, DVD, floppy, or USB card. However, it will be recognized that any suitable memory device may be used. Removable memory devices give the added advantage of allowing the customers to transfer the files to their personal computers.

Figure 3:
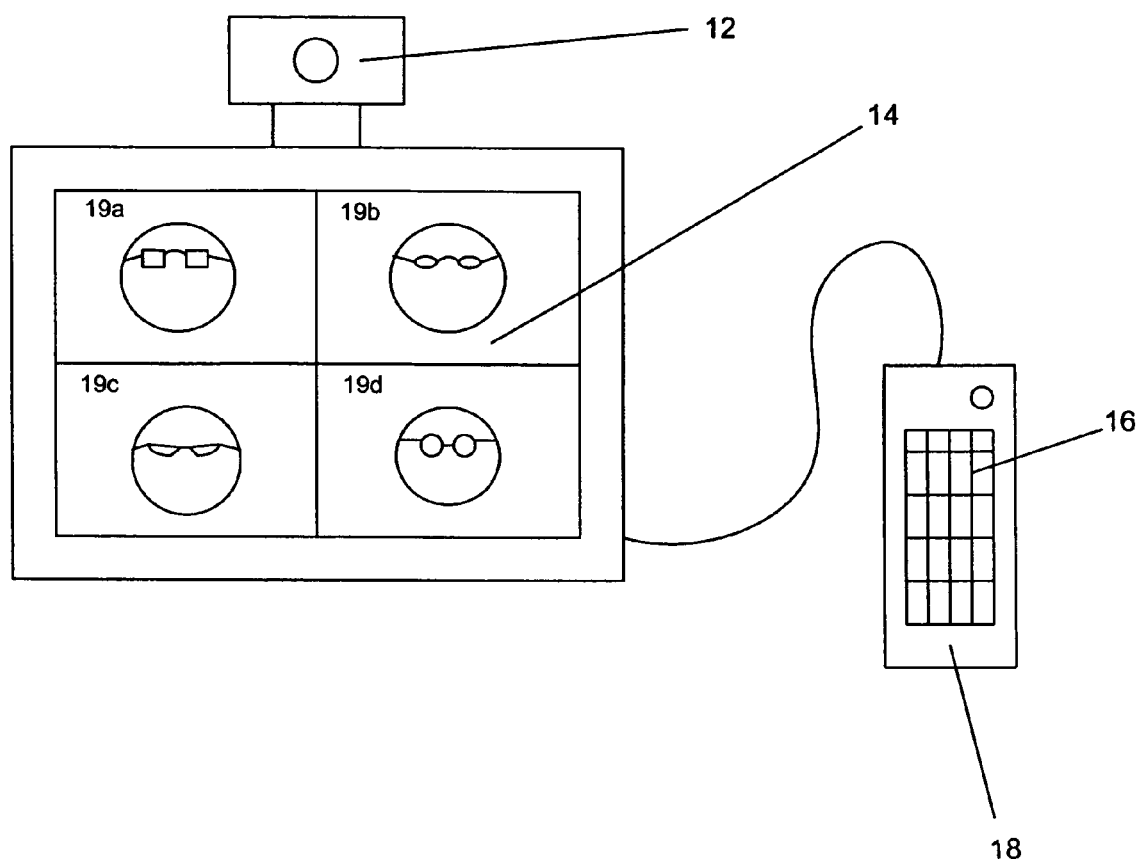
FIG. 3 is another embodiment illustrating the personal optical viewer including a remote and memory device.

FIG. 3 is another representative embodiment illustrating the personal optical viewer 20. In this embodiment a remote control 18 is used as an alternative to the command module 16. The remote 18 may, for example, use current wireless technologies or it may be hardwired to prevent theft or loss.

The display 14 presents at least one or more of the images 19. In one embodiment, the customer 10 may change the number of viewable images 19. For example, if the customer 10 has loaded ten images, the monitor 14 will, by default in this example, only display four of the images 19, which are then positioned to fill the entire screen. The customer 10 may override the default display using the command module 16 options and choose to display two, four, six, eight, or all ten of the images 19.

In another embodiment, while viewing the images 19, if the customer 10 determines that a certain accessory is not favorable, the image 19 may be deleted or removed from the display 14 and the remaining images 19 would automatically enlarge to fill the display 14. Ultimately, the customer's 10 favorite images 19 remain and a purchase may be made according to the most favorable images 19.

Figure 4:
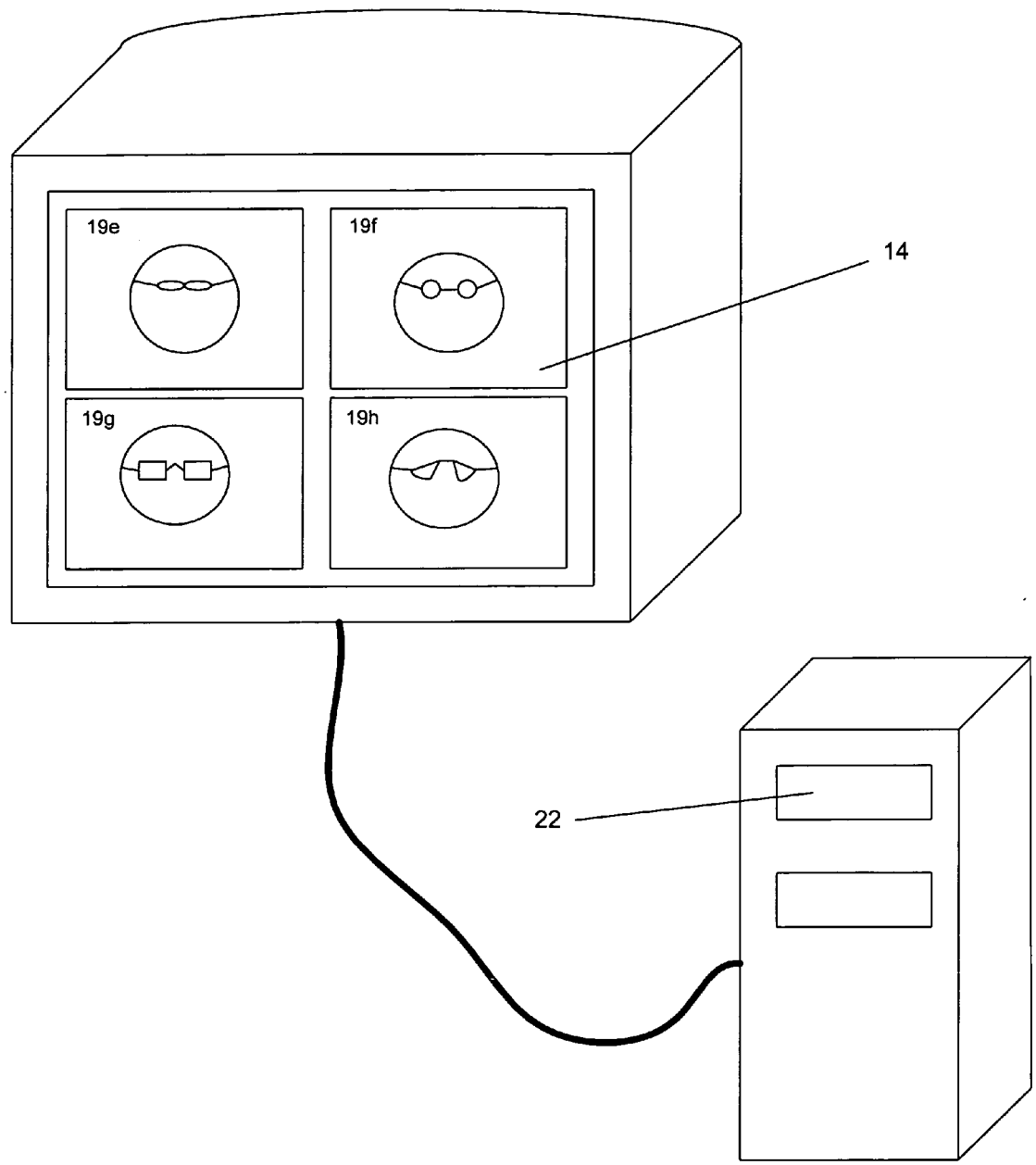
FIG. 4 is an illustration of another embodiment of the personal optical viewer including a memory device.

Another embodiment of the present invention is shown in FIG. 4. In certain circumstances the customer 10 may choose to view only four images 19 at a time. When one image 19 is deleted or removed from the display 14 the software automatically generates another image 19 from the memory device 22 to fill the empty position on the display 14. This process repeats until the images in the memory device 22 have been exhausted. At such a point, when an image 19 is rejected from the display 22, the remaining displayed images 19 enlarge to fill the screen.

Figure 5:
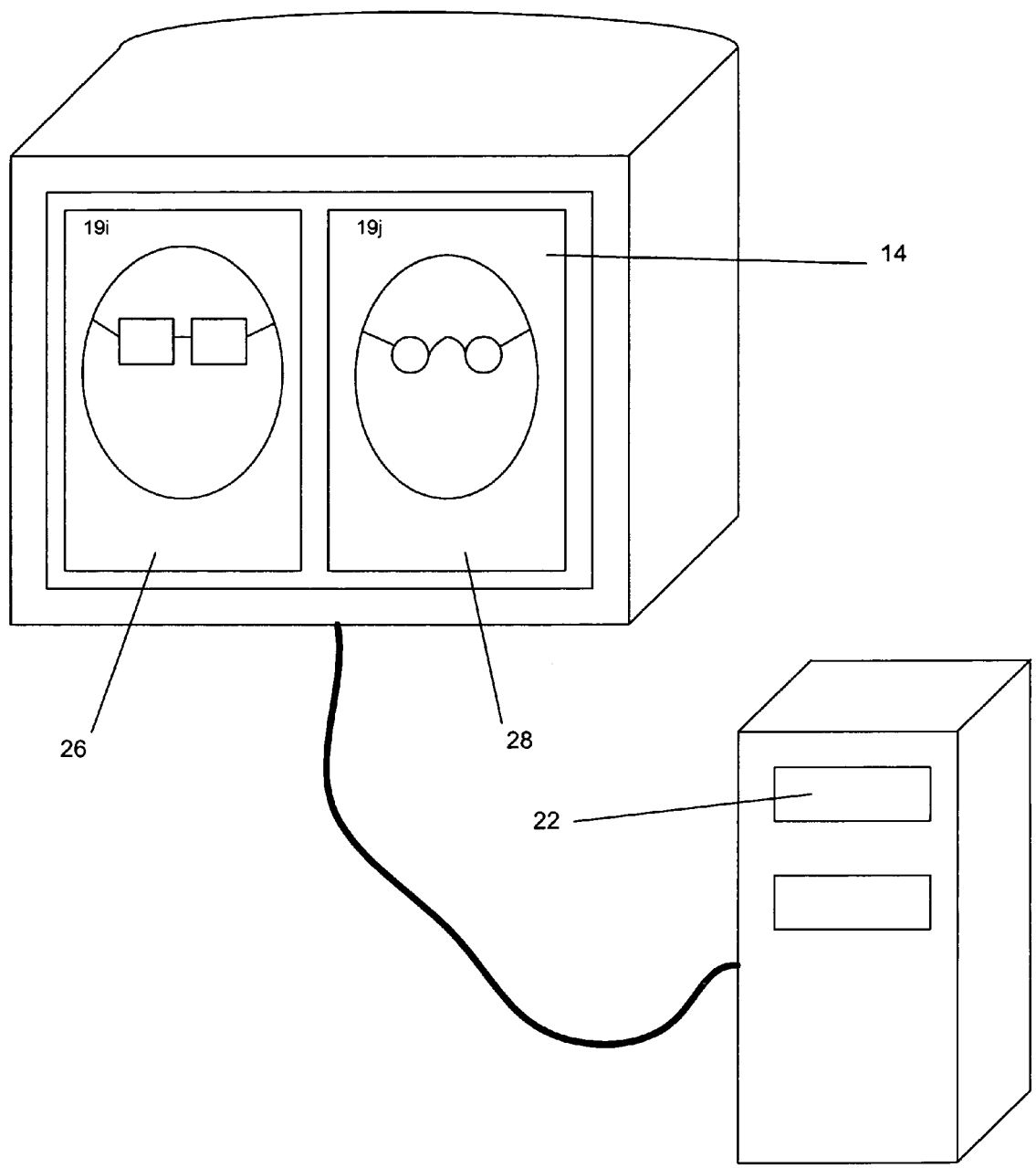
FIG. 5 is another illustration of an embodiment of the personal optical viewer using showing the virtual primary and secondary sections.
Figure 6:
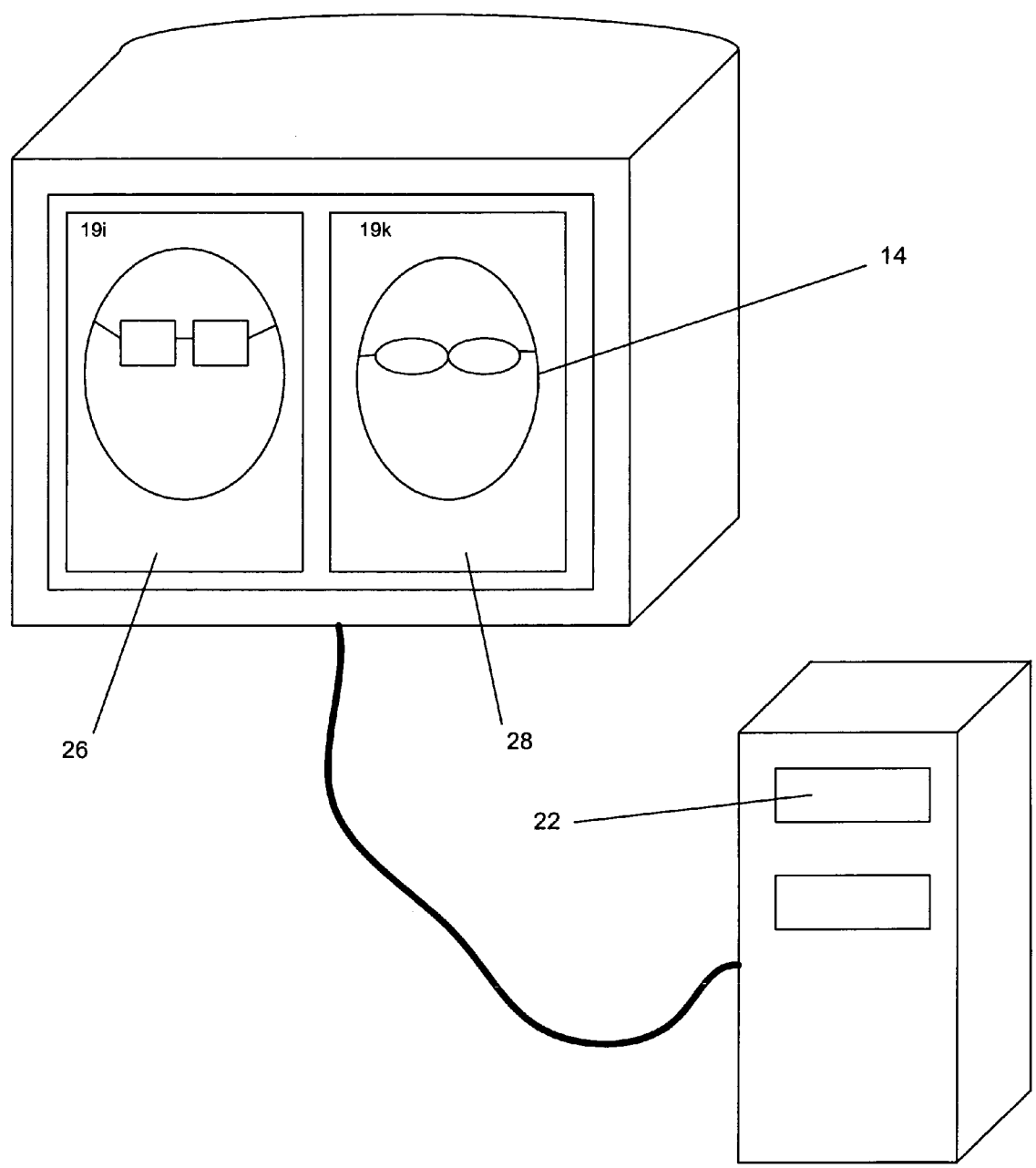
FIG. 6 is another illustration of an embodiment of the personal optical viewer using the memory device to generate a compare image.
Figure 7:
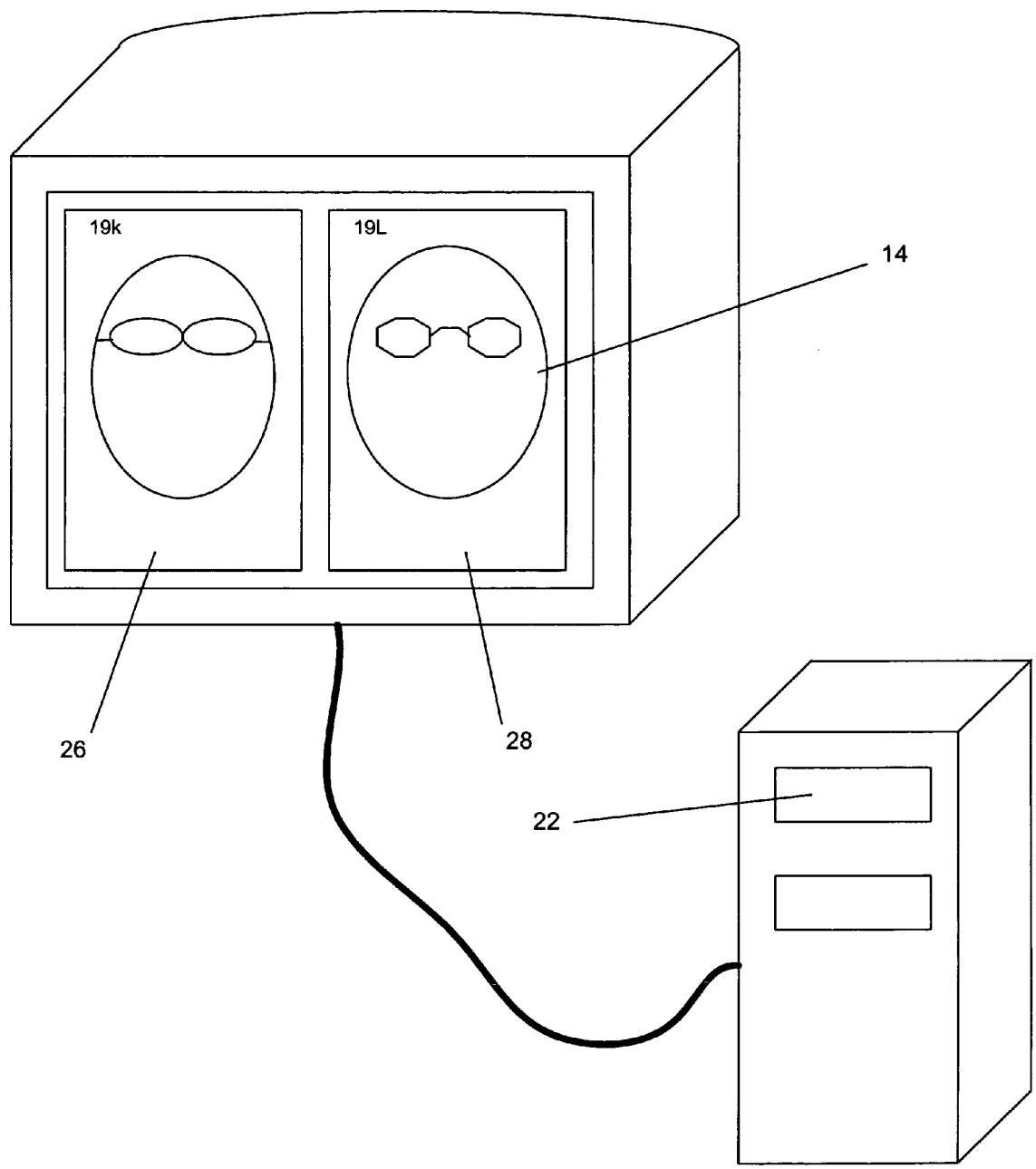
FIG. 7 is another illustration of an embodiment of the personal optical viewer using the memory device to regenerate the preferred image and generate a compare image.

Referring to the embodiments illustrated in FIGS. 5–7, the screen maybe virtually sectioned into primary 26 and secondary sections 28. The primary section 26 displays a preferred image 19i while the secondary section 28 displays a compare image 19j. For example, if the customer 10 prefers the preferred image 19i over the compare image 19j, the compare image 19j is deleted or removed through the command module 16 options, and another image 19k stored in the memory device 22 is displayed in its place (see FIG. 6). If the customer 10 prefers the compare image 19j over the preferred image 19i, the preferred image 19i is deleted or removed and the compare image 19k regenerates in the primary section 26 while a new compare image 19L generates in the secondary section 28 (see FIG. 7).

Figure 8:
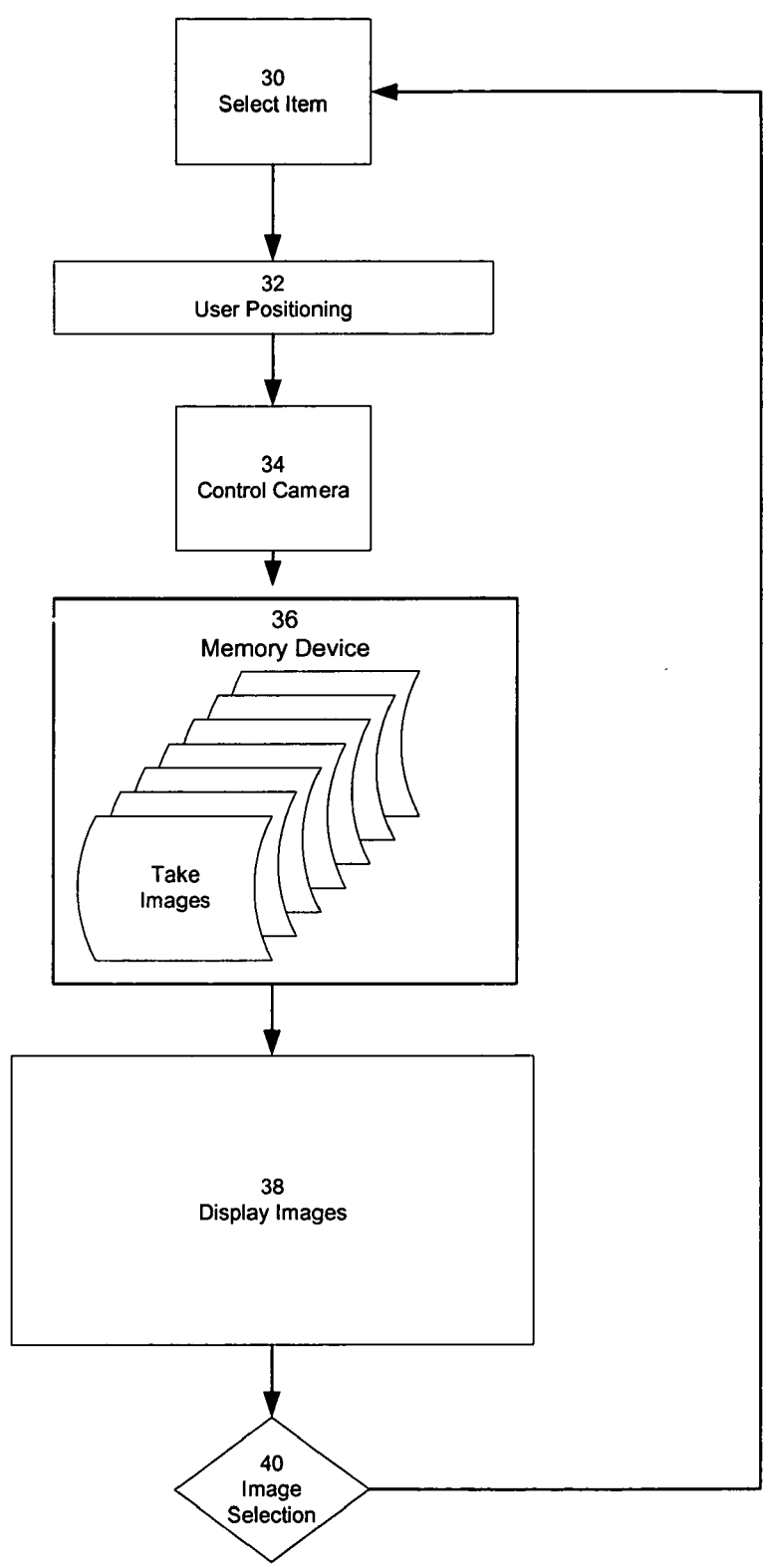
FIG. 8 is a flow chart illustrating an embodiment of the method of using a personal optical viewer in accordance with the present invention.

FIG. 8 is a flow chart of a process of one embodiment of the current invention. First, the customer 10 selects 30 any accessory to wear to view on the display 16. As an example, the customer 10 may choose an eyeglass frame, an outfit, or a combination of both. The customer 10 stations 32 him/herself in front of the wall mounted, portable, or desk top personal optical viewer 20. The customer controls 34 the zoom, the focus, and the focus area of the digital capture device 12 with the selection module 16. The customer 10 or a third party user initiates the digital capture device 12 to capture at least one image of the customer 10. This process may be repeated any number of times for different accessories. The images are stored 36 in the memory device 22. The personal optical viewer 20 displays 38 the images 19 on the display 14 screen and the customer 10 selects 40 the images 19 to view, delete, remove, save, or enlarge.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A personal viewing system for enabling a person to view images of the person wearing an accessory, at a store, the system being comprised of:
   a digital capturing device for capturing one or more images of the person wearing an accessory, wherein the captured images are digital still and/or video images;
   a memory device for storing the images in a memory;
   a display device for displaying the images, wherein the display is virtually sectioned into a primary and a secondary section for comparing a preferred image to a compare image; and
   a command module for reviewing the images;
   wherein the memory device automatically displays previously undisplayed images when the person rejects, through the command module, a displayed image.

2. The personal viewing system according to claim 1, wherein the digital capturing device rotates 360 degrees.

3. The personal viewing system according to claim 1, wherein the digital capturing device tilts forward and backward.

4. The personal viewing system according to claim 1, wherein when the images in the memory device have exhausted, the displayed images automatically enlarge to fill the display when other displayed images are rejected.

5. The personal viewing system according to claim 1, wherein the display device is portable.

6. The personal viewing system according to claim 1, wherein the display device is wall mounted.

7. The personal viewing system according to claim 1, wherein when the person rejects an image from the primary or secondary section, the memory device automatically displays a previously undisplayed image to one of the primary section or the secondary section.

8. The command module according to claim 1, further comprising a customer selector.

9. The command module according to claim 1, wherein the customer selector provides for switching between more than one customer for reviewing images.

10. A method for enabling a person to view images of the person, at a store, the method comprising the steps of:
    capturing one or more images of the person wearing an accessory, wherein the captured image or images are digital still and/or video images;
    storing the images in a memory device;
    displaying the images on a screen, comprising a step of displaying one of an undisplayed image stored in the memory device, after one of the displayed images has been rejected; and
    providing a command module to enable the person to review the images.

11. The method of claim 10, wherein the accessory is eyeglass frames.

12. The method of claim 10, wherein the accessory is clothing.

13. The method of claim 10, wherein the displaying step displays to the person a predetermined number of the images.

14. The method of claim 10, wherein, when the images stored in the memory device have been exhausted, the displayed images automatically enlarge to fill the screen when additional displayed images are rejected.

15. The method of claim 10, wherein the command module is a wireless remote.

16. The method of claim 10, wherein the command module is a hard-wired remote.

17. The method of claim 10, wherein the command module is a touch-screen.

18. The method of claim 10, wherein the memory device stores the images from more than one capturing device.

* * * * *

UNITED STATES PATENT AND TRADEMARK OFFICE
CERTIFICATE OF CORRECTION

PATENT NO.       : 7,154,529 B2                                           Page 1 of 1
APPLICATION NO.  : 10/799414
DATED            : December 26, 2006
INVENTOR(S)      : Donald G. Hoke It is certified that error appears in the above-identified patent and that said Letters Patent is hereby corrected as shown below:

Column 4, Line 11 - "maybe" should be --may be--

Signed and Sealed this

Sixth Day of March, 2007

JON W. DUDAS
*Director of the United States Patent and Trademark Office*